(No Model.)

I. S. BRANDENBURG.
STEAM COOKER.

No. 404,255. Patented May 28, 1889.

Witnesses.
Wm A. Skinkle
Arthur Johnson.

Inventor
Isaac D. Brandenburg
By his Attorneys
Wiles, Greener Mead

N. PETERS. Photo-Lithographer, Washington, D. C.

UNITED STATES PATENT OFFICE.

ISAAC S. BRANDENBURG, OF PEORIA, ILLINOIS.

STEAM-COOKER.

SPECIFICATION forming part of Letters Patent No. 404,255, dated May 28, 1889.

Application filed July 23, 1887. Serial No. 245,060. (No model.)

*To all whom it may concern:*

Be it known that I, ISAAC S. BRANDENBURG, a citizen of the United States, residing at Peoria, in the county of Peoria and State of Illinois, have invented certain new and useful Improvements in Steam-Cookers; and I do hereby declare that the following is a full, clear, and exact description of the invention, which will enable others skilled in the art to which it appertains to make and use the same.

My invention relates to those steam-cookers in which the food to be cooked is placed in removable pails, cans, or the like, and subjected to the indirect and direct action of steam and the indirect action of hot water.

The object of my invention is to produce a cooker of the kind described which shall be simple and economic in construction and effective in use; and with these objects in view the invention consists in a steam-cooker made substantially in the manner hereinafter described, and pointed out in the claims.

In order that my invention may be fully understood, I will proceed to describe it with reference to the accompanying drawings, in which—

Figure 1:
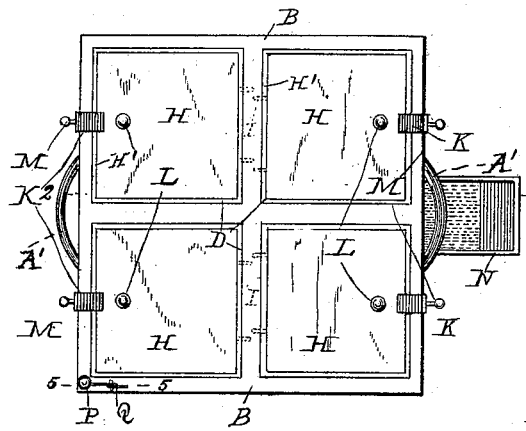
Figure 3:
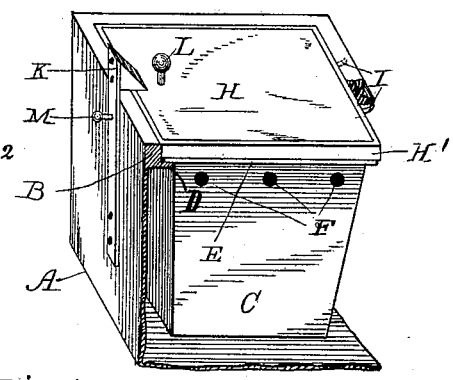
Figure 2:
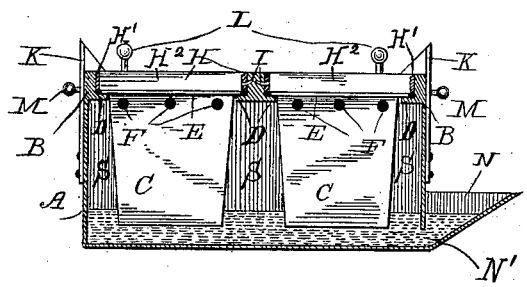
Figure 4:
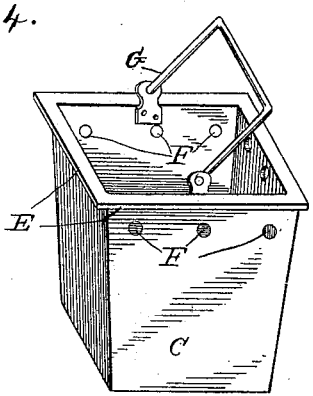
Figure 5:
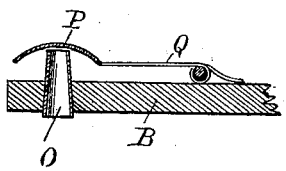

Figure 1 is a plan view of my improved cooker. Fig. 2 is a vertical section of the cooker on the line 2 2, Fig. 1, showing the cover for the receptacle and the means for securing it in place. Fig. 3 is a perspective view of a corner of the device, looking from the inside. Fig. 4 is a perspective view of one of the food-receptacles. Fig. 5 is a detail sectional view showing an escape-valve applied to the cooker on the line 5 5, Fig. 1.

A represents a shell or casing, made of sheet metal in order to render it easily portable.
The shell is provided with handles A', and is designed to be placed over a heater of any desired kind, such as a stove, gas or gasoline heater, or the like.

At the top of the shell is placed a frame, B, made of angle-iron, having openings for the reception of the food-receptacles C. Around each opening in the frame designed to receive the receptacles is a horizontal flange, D, which serves as a support for the food-receptacles.

The food-receptacles C are made of sheet metal, preferably tin, and are each provided at their top with a horizontal flange, E, which, when the cooker is ready for use, rests on the flange D of the frame B. Each of the receptacles C is provided with a bail, G, for convenience in handling, and each receptacle is also provided near its top with a series of holes, F, which allow the entrance of steam into the food-receptacles in order that it may come in contact with the substances being cooked.

When the cooker is in use, the space between the top of the food-receptacles and the top of the frame B is occupied by a cover, H, having vertical flanges H² fitting outside and surrounding the tops of the receptacle, fitting against the frame, and made flush with the top of the latter. This cover is preferably made of metal, and has around its edge a rubber gasket, H', which insures a steam-tight joint with the frame into which it is placed, and thus prevents the escape of steam, fumes, or aroma from the substance being cooked. The food-receptacles are so arranged in the frame that their entire surface is below said frame, and is therefore impinged upon at all points by the steam.

The cover is removable, and is provided on one side with the upwardly-curved pins or projections I, which are designed to enter curved sockets in the frame B when the cover is held in an inclined position, and which serve to hold the cover firmly in place when the latter is brought to a horizontal position.

The shell is provided with spring-catches K, of a number corresponding to the number of covers used, and these catches are provided with beveled heads, which support the covers in inclined position, or are displaced by the descent of the covers to their places, and which spring back and hold the covers in position when said covers are brought to a level with the top of the frame B. The covers and the spring-catches are each provided with knobs or handles L and M, respectively, for convenience in manipulating them.

The bottom of the shell forms a trough, which communicates with a water gage or spout, N, fixed to the side in front of an opening, N', in order that the height of the water may be ascertained at any time. The bottoms of the receptacles extend down into the trough, forming, in connection with the sides of the casing, a tight steam-space, S, around the receptacles between the surface of the water and the top frame.

Practical experiments have demonstrated that the best results in cooking may be attained by having the food-holders project a short distance into the water.

The water-gage may be used to keep the water at the desired level.

In order to prevent the accumulation of an undue pressure of steam in the cooker, I provide in one corner of the cooker an escape-valve. (Shown in detail in Fig. 5 of the drawings.) This consists of a tube, O, set in the top frame of the cooker in communication with the interior of the latter, and the cap P, arranged to close the outer end of the tube. This cap is held in place by a spring, Q, which is sufficiently strong for the purpose, to hold the cap in place during ordinary steam-pressure and to be overcome when an excess of pressure exists.

The food-receptacles are arranged in the shell a sufficient distance apart to allow the free circulation of the steam around and between them, and to allow the steam to enter the holes in the tops of the receptacles to impinge upon the substance to be cooked.

Having thus described my invention, the following is what I claim as new therein and desire to secure by Letters Patent:

1. The combination of the shell A, provided with a top frame, B, having openings for the receptacles, and horizontal flanges D around the openings, leaving spaces above the flanges, the receptacles C, having horizontal flanges E at the top thereof resting on the frame-flanges, and the covers H, fitting within the spaces, having vertical flanges H² outside and surrounding the tops of the receptacles and fitting against the frame, substantially as described.

2. The combination of the shell A, provided with a top frame, B, having openings for the receptacles, horizontal flanges D around the openings, leaving spaces above the flanges, and curved sockets at the sides of the spaces, the receptacles C, having horizontal flanges E at the top thereof resting on the frame-flanges, and the covers H, fitting within the spaces, having vertical flanges H² surrounding the tops of the receptacles, and provided with upwardly-curved pins I, working in the sockets, substantially as described.

3. The combination of the shell A, provided with a top frame, B, having openings for the receptacles, and horizontal flanges D around the openings, leaving spaces above the flanges, the vertical spring-catches K, secured to the shell, having beveled heads, the receptacles C, having horizontal flanges E at the top thereof resting on the frame-flanges, and the covers H, hinged to the frame and fitting within the spaces, having vertical flanges H² surrounding the tops of the receptacles and seating on the flanges, the edges of the cover-flanges being adapted to rest on the beveled heads or to drop thereunder, substantially as described.

4. A steam-cooker consisting of the shell A, provided with a top frame, B, having openings for the receptacles, horizontal flanges D around the openings, leaving spaces above the flanges and curved sockets at the sides of the spaces, the vertical spring-catches K, secured to the shell, having beveled heads, the receptacles C, having horizontal flanges E at the top thereof resting on the frame-flanges, and the covers H, fitting within the spaces, having vertical flanges H² surrounding the tops of the receptacles, and provided with upwardly-curved pins I, working in the sockets, substantially as described.

In testimony whereof I affix my signature in presence of two witnesses.

ISAAC S. BRANDENBURG.

Witnesses:
DAVID H. MEAD,
A. KEITHLEY.